United States Patent
Gentsu

[11] Patent Number: 5,889,914
[45] Date of Patent: Mar. 30, 1999

[54] OPTICAL FIBER POSITIONING MEMBER AND METHOD OF POSITIONING FIXED OPTICAL FIBERS BY USING THE MEMBER

[75] Inventor: Takuya Gentsu, Gamo-gun, Japan

[73] Assignee: Kyocera Corporation, Kyoto, Japan

[21] Appl. No.: 455,461

[22] Filed: May 31, 1995

[30] Foreign Application Priority Data

Jun. 30, 1994 [JP] Japan .................................. 6-150095

[51] Int. Cl.[6] ........................................... G02B 6/26
[52] U.S. Cl. ........................... 385/137; 385/65; 385/71; 385/80; 385/83
[58] Field of Search .............................. 385/51, 52, 54, 385/65, 71, 72, 80, 83, 94, 131, 132, 137; 228/120

[56] References Cited

U.S. PATENT DOCUMENTS

5,644,667  7/1997  Tabuchi ..................................... 385/49

FOREIGN PATENT DOCUMENTS

55-156908  12/1980  Japan ..................................... 385/137
61-273502  12/1986  Japan .

*Primary Examiner*—John D. Lee
*Assistant Examiner*—Juliana K. Kang
*Attorney, Agent, or Firm*—Loeb & Loeb LLP

[57] ABSTRACT

A thin film layer formed of a material having good wetting properties with respect to solder is laid on a joining surface of a second substrate, and at the same time, a thin film layer formed of Au is laid on a joining surface excluding concave grooves of a first substrate, and optical fibers are placed in the concave grooves of said first substrate, and then urged by the second substrate from the upper side thereof to cause the thin film layer on the first substrate to be plastically deformed and joined by a solder. The solder allows the optical fibers to be urged against the concave grooves of the first substrate, and at the same time, the thin film layer which is formed of Au and protruded to the concave groove side allows a change in the volume of the solder and a dislocation of the optical fibers to be prevented, and the optical fibers to be positioned fixedly at a high accuracy in the concave grooves.

10 Claims, 6 Drawing Sheets

OPTICAL FIBER POSITIONING MEMBER AND METHOD OF POSITIONING FIXED OPTICAL FIBERS BY USING THE MEMBER

BACKGROUND OF THE INVENTION

The present invention relates to an optical fiber positioning member for fixedly positioning optical fibers by placing the optical fibers in concave grooves engraved in one substrate and by holding the optical fibers by the other substrate and a method of fixedly positioning the optical fibers by using the member, and more particularly to an optical fiber array for connecting the optical fibers with integrated optical parts such as optical waveguide ways, photodiodes, laser diodes and integrated optical elements, and to a ferrule, such as an optical connector and an optical splicer.

Heretofore, where a plurality of optical fibers are connected to integrated optical parts, such as optical waveguide ways, photodiodes, laser diodes and integrated optical elements, and where a singular or a plurality of optical fibers are connected to each other through an optical connector or an optical splicer, in order to reduce optical transmission loss between joining surfaces to a low value as possible, a plurality of the optical fibers linearly arranged have been required to have a very high positioning accuracy such that both a horizontal pitch accuracy and a vertical pitch accuracy have been required to be ±0.5 $\mu$m or less each. The horizontal pitch accuracy means an average value of dislocated widths between optical fibers arranged horizontally; and the vertical pitch accuracy means an average value of vertically dislocated widths of the optical fibers with respect to a horizontal line as a reference.

Now, as shown in FIG. 8, where an optical waveguide way 30 is connected to a plurality of optical fibers 10, in order to arrange the optical fibers 10 to form a line at the above-mentioned positioning accuracy, there has been used an optical fiber positioning member 11 provided with a plurality of V-shaped grooves 3 on the surface thereof such that the respective optical fibers 10 have been placed on the V-shaped grooves 3 of the above-mentioned optical fiber positioning member 11, and then respective optical fibers 10 have been connected at a high accuracy to branched optical waveguide paths 31 of the optical waveguide way 30.

Also, the above-mentioned optical fiber positioning member 11, as shown in FIG. 6, has eight-core V-shaped grooves 3 engraved with a high accuracy in a joining surface 2a, and comprises a first substrate 2 provided with a concave cutout portion 4 at the rear end thereof and a flat plate-shaped second substrate 5 shorter than the above-mentioned first substrate 2, and there have been both the substrates 2, 5 formed of a plastic or a glass, or a ceramic etc. As a method of fixedly positioning respective optical fibers 10 in a ribon optical fiber 20 by using the optical fiber positioning member 11, there has been a method in which respective optical fibers 10 have been placed in the V-shaped grooves 3 of the first substrate 2, an epoxy-based or acryl-based adhesive 15 having thermoset properties or ultraviolet curing properties has been applied to the upper portion thereof, and then the second substrate 5 has been placed from the upper side thereof, and heat or light has been applied to the adhesive 15 to cure, whereby respective optical fibers 10 have been held between the first substrate 2 and the second substrate 5 so as to be positioned fixedly in the V-shaped grooves 3.

However, there has existed a problem that generally the adhesive 15, when cured, changes greatly in volume.

Therefore, in the above-mentioned optical fiber positioning member 11 in which respective optical fibers 10 are positioned fixedly in the V-shaped grooves 3 by the adhesive 15, as shown in FIG. 7, as the adhesive 15 is cured, the second substrate 5 can be dislocated laterally, and at the same time, the optical fibers 10 can be pulled to be separated from the side wall 3a of the V-shaped grooves 3, whereby respective optical fibers 10 can not be fixedly positioned in the V-shaped grooves 3.

Also, the adhesive 15 has changed largely in volume due to an environmental change, so that the respective optical fibers 10 can not be fixedly positioned with high accuracy in the V-shaped grooves 3 of the first substrate 2.

That is, there has been a problem that the adhesive 15 absorbs water content existing in the atmosphere to cause a change in volume, with the result that the optical fibers 10 are separated from the side wall 3a of the V-shaped grooves 3. Also, even when used at a high temperature, the adhesive 15 changes its volume, whereby the optical fibers 10 could not be fixedly positioned at a high accuracy in the V-shaped grooves 3.

SUMMARY OF THE INVENTION

An object of the present invention is to provide an optical fiber positioning member capable of fixedly positioning respective optical fibers in concave grooves engraved in a first substrate without being affected by an environmental change for a long period, thereby fixedly positioning the optical fibers with high accuracy.

Thus, in view of the above-mentioned circumstances, the present invention is made such that a thin film layer formed of a material having good wetting properties with respect to solder is laid on a joining surface of the second substrate, and at the same time, a thin film layer formed of Au and having a film thickness 2 to 10 $\mu$m is laid on a joining surface excluding the concave grooves of the first substrate, and both the substrates are solder joined to compose the optical fiber positioning member.

Also, the present invention is made such that the optical fibers are placed in the concave grooves of the above-mentioned first substrate, the upper side thereof is urged by the above-mentioned second substrate to which solder has been applied to plastically deform the thin film layer formed of Au of the above-mentioned first substrate, and both the substrates are solder joined to position fixedly the optical fibers at a high accuracy in the concave grooves of the above-mentioned first substrate.

According to the present invention, thin film layers having good wetting properties with respect to solder are laid on the respective joining surfaces of the first substrate and the second substrate, which are then solder joined, whereby both the substrates can be firmly joined. Further, no thin film layer is provided in the concave grooves of the first substrate, so that the optical fibers can be positioned at a high accuracy in the concave grooves.

Also, according to the present invention, the thin film layer laid on the first substrate employs Au having a very high stability against an environmental change, so that the layer develops little deformation for a long period, thereby preventing a lateral dislocation of the second substrate and a dislocation of optical fibers associated with the lateral dislocation of the second substrate.

Further, according to the present invention, the Au thin film layer having a film thickness within a particular range is laid on the first substrate, and at the same time, the thin film layer of the above-mentioned first substrate is plastically deformed when the optical fibers are cured, so that part of the thin film layer formed of Au protrudes in a manner to cover the optical fibers, and the protrusion of the thin film layer allows the dislocation of the optical fibers and the change in solder volume to be controlled, thereby allowing the optical fibers to be firmly urged against the side wall of the concave grooves.

DETAILED DESCRIPTION OF THE PREFERRED EMBODIMENTS

Embodiments of the present invention will be explained hereinafter, where the same parts as those of prior art examples are designated by the same reference codes.

Figure 1A:
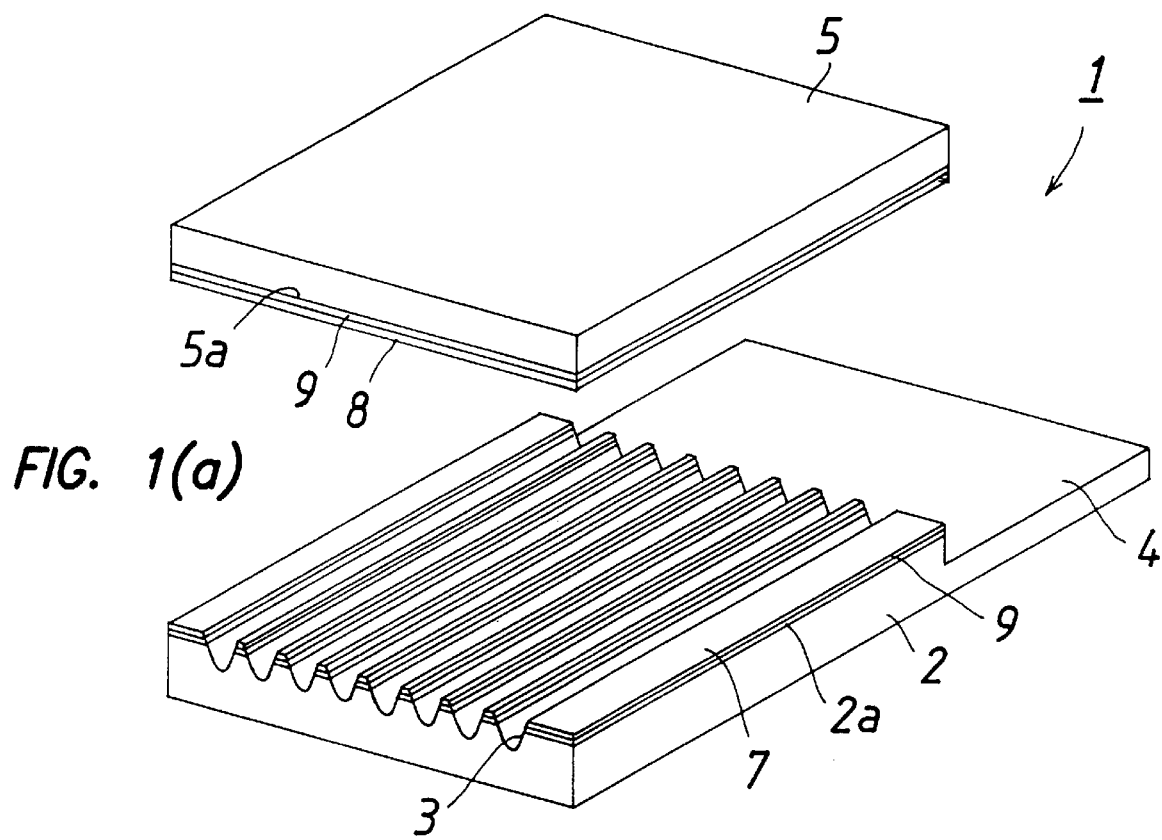
FIG. 1(a) is an exploded view showing an optical fiber positioning member in connection with the present invention.
Figure 1B:
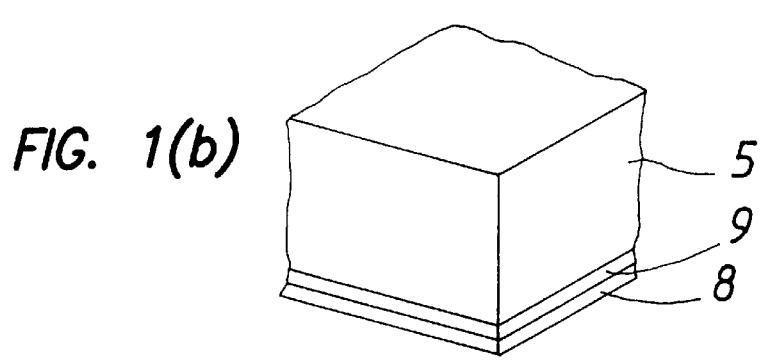
FIG. 1(b) is a perspective view in which the major parts of a second substrate shown in (a) are enlarged.

FIG. 1(a) is a perspective view in which an optical fiber positioning member 1 in connection with the present invention is exploded; FIG. 1(b) is a perspective view in which the major parts of the second substrate 5 shown in FIG. 1(a) are enlarged; and FIG. 1(c) is a perspective view in which the major parts of the first substrate 2 shown in FIG. 1(a) are enlarged.

Figure 1C:
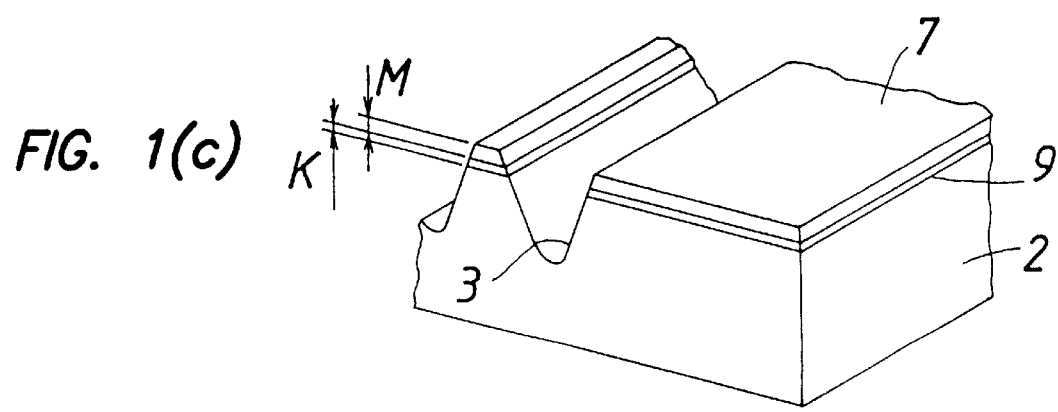
FIG. 1(c) is a perspective view in which the major parts of a first substrate shown in (a) are enlarged.

As shown in FIGS. 1(a), 1(b) and 1(c), the optical fiber positioning member 1 of the present invention has a plurality of highly accurate V-shaped grooves 3 engraved in a joining surface 2a, and comprises the first substrate 2 provided with a concave cutout portion 4 at the rear end thereof and the flat plate-shaped second substrate 5 shorter than the above-mentioned first substrate 2. Laid on a joining surface 5a of the above-mentioned second substrate 5 is a thin film layer 8 formed of a material having good wetting properties with respect to solder through an intermediate layer 9 of a metal such as NiCr and Ti, or of a metallic nitride such as TiN, CrN and TiCN, or of a material obtained by laminating them; and laid on the joining surface 2a excluding the V-shaped grooves 3 of the above-mentioned first substrate 2 is a thin film layer 7 formed of Au and having a film thickness M of 2 to 10 μm, preferably 2 to 7 μm through the intermediate layer 9 similar to the above-mentioned second substrate 5. The material having good wetting properties with respect to solder includes Au, Ni, Sn, Pb, Cu and Al.

Figure 2A:
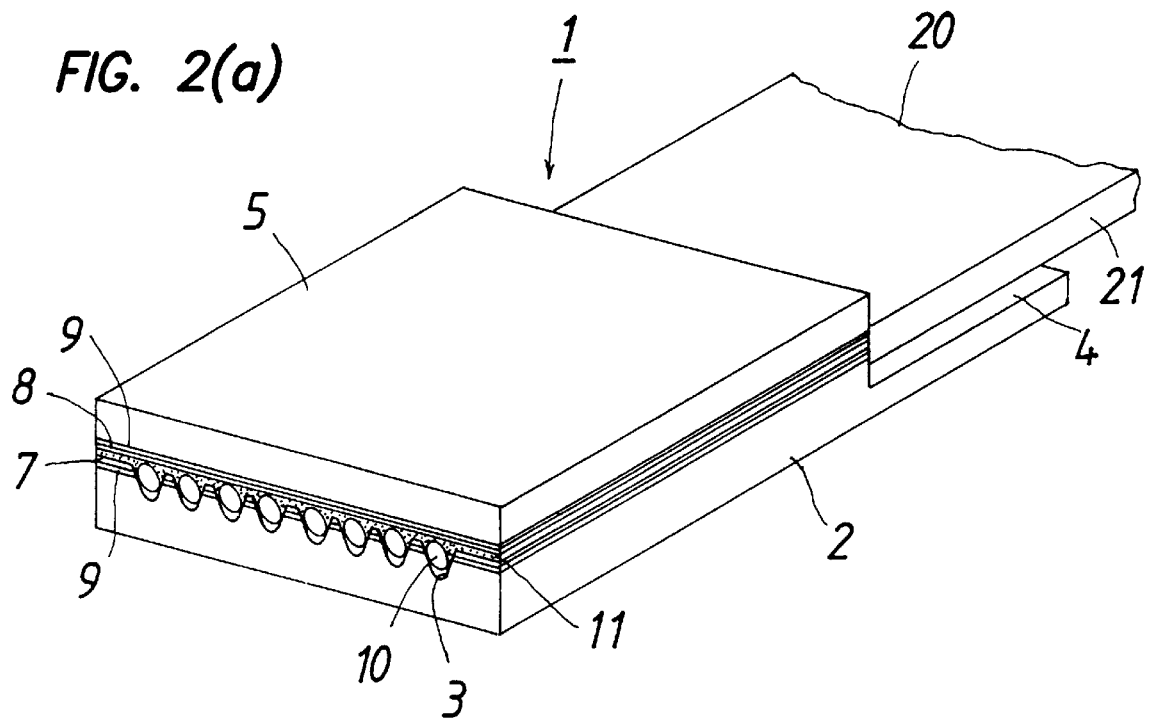
FIG. 2(a) is a perspective view showing a state in which optical fibers are positioned fixedly by the optical fiber positioning member in connection with the present invention.

FIG. 2(a) is a perspective view showing a state in which optical fibers 10 are positioned fixedly by the optical fiber positioning member 1 in connection with the present invention, a covering portion 21 of a ribon optical fiber 20 is placed on the concave cutout portion 4 of the first substrate 2, and at the same time, respective optical fibers 10 from which the covering portion 21 has been stripped off are arranged in the respective V-shaped grooves 3, and the second substrate 5 is placed from the upper side thereof and joined by a solder 11, whereby the optical fibers 10 are held by the first substrate 2 and the second substrate 5 so as to be positioned fixedly in the V-shaped grooves 3.

Figure 2B:
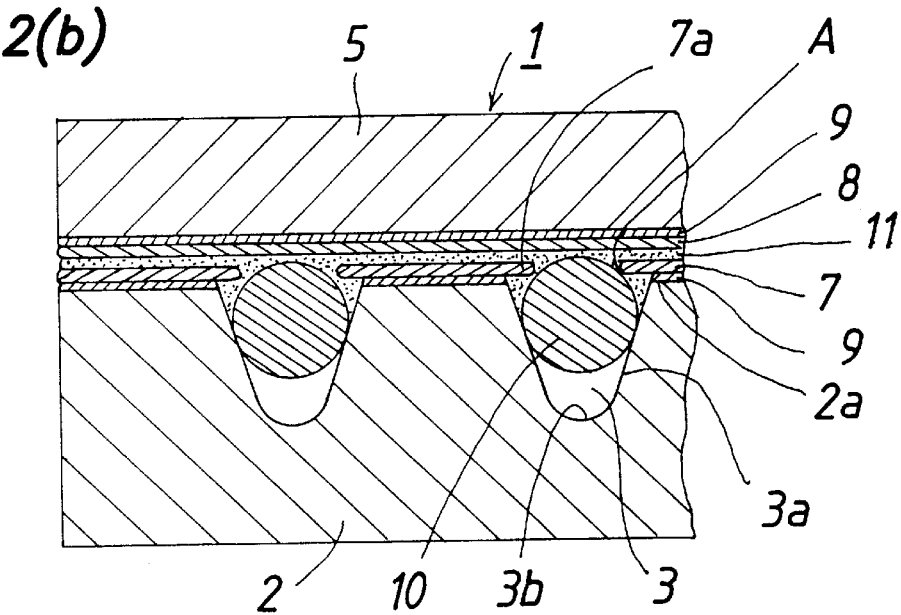
FIG. 2(b) is a sectional view in which the major parts are enlarged.

At this point, as shown in FIG. 2(b), respective optical fibers 10 are positioned by being abutted completely against a side wall 3a of the V-shaped grooves 3 engraved in the first substrate 2, and the upper portion of the optical fibers 10 are covered completely with the solder 11, so that respective optical fibers 10 can be positioned fixedly with high accuracy in the V-shaped grooves 3. Further, part of the thin film layer 7 which is formed of Au and laid on the joining surface 2a of the first substrate 2 is plastically deformed and protruded to the V-shaped groove 3 side when the second substrate 5 is urgedly fixed, whereby a protrusion 7a of the thin film layer 7 allows a change in the volume of the solder 11 to be prevented and a development of the dislocation of the optical fibers 10 to be blocked.

In this manner, the optical fiber positioning member 1 of the present invention has the thin film layers 7, 8 having good wetting properties with respect to the solder 11 laid on the first substrate 2 and the second substrate 5 both of which are joined by the solder 11, so that the optical fiber positioning member 1 is hardly affected by an environmental change unlike the joining by a conventional adhesive, and the first substrate 2 and the second substrate 5 can be firmly joined to each other. Further, the thin film layers 7 of the first substrate 2 employs Au having a very high stability against an environmental change, so that there is developed no lateral dislocation of the second substrate 5 even for a long period, and also there is developed no dislocation of the optical fibers 10 associated with the lateral dislocation of the above-mentioned second substrate 5.

The shape of the grooves engraved in the first substrate 2 is not limited to the V-shape of the grooves 3, and may be a shape by which the optical fibers 10 can be correctly and highly accurately positioned, or the grooves may form concave grooves such as U-shaped or semicircle grooves, or square grooves. Also, the number of the V-shaped grooves 3 of the above-mentioned first substrate 2 is not limited to eight cores.

Now, it is preferable that the material composing the above-mentioned both substrates 2 and 5 is formed of a ceramic, a glass or a silicon.

For example, the ceramic may be alumina ceramics or zirconia ceramics, or silicon carbide-quality ceramics or silicon nitride-quality ceramics, and further, the ceramic can be formed of forstelite ($2MgO.SiO_2$) or machinable ceramics, or sapphire. Particularly, zirconia ceramics, silicon carbide-quality ceramics and silicon nitride-quality ceramics have fine crystal particles and thus offer a very high surface accuracy, so that they are most suitable to form highly accurate V-shaped grooves 3. Forstelite ($2MgO.SiO_2$) and machinable ceramics contain a glass component and thus are excellent in machinability, so that they can form highly accurate V-shaped grooves 3. For glass, particularly a crystallized glass is appropriate, as with the above-mentioned forstelite ($2MgO \cdot SiO_2$) and machinable ceramics, and is excellent in machinability and has a moderate hardness, so that it can easily form highly accurate V-shaped grooves 3. Silicon, as with the above-mentioned glass, is excellent in machinability, and an intermediate layer 9 becomes unnecessary, so that silicon can form a thin first substrate 2.

On the other hand, the reason why the film thickness M of the thin film layer 7 which is formed of Au and laid on the above-mentioned first substrate 2 is made 2 to 10 $\mu$m is that if the film thickness M is less than 2 $\mu$m, the film thickness M is excessively thin, so that even if the thin film layer 7 is plastically deformed by being urged by the second substrate 5, part of the thin film layer 7 could not be protruded to the V-shaped groove 3 side, and on the contrary, if film thickness M is more than 10 $\mu$m, the protrusion 7a of the thin film layer 7 plastically deformed would cover the optical fibers 10, so that the upper portion of the optical fibers 10 would not be sufficiently filled with the solder 11 to develop a dislocation of the optical fibers 10.

Further, laid between the substrates 2, 5 and the thin film layers 7, 8 is the intermediate layer 9 of a metal such as NiCr and Ti, or of a metallic nitride such as TiN, CrN and TiCN, or of a material obtained by laminating them, and providing the intermediate layer 9 allows the strength of adhesion to the thin film layers 7, 8 to be increased. However, if a film thickness K of the intermediate layer 9 laid on the first substrate 2 becomes excessively thick, a film thickness M of the thin film layer 7 would have to be thin and cause an inconvenience, so that it is desirable that the upper limit of the film thickness K is made 0.3 $\mu$m. Where possible, the thin film layer 7 formed of Au and the thin film layer 3 having good wetting properties with respect to the solder 11 may be directly laid on both the substrates 2 and 5.

A method of manufacturing the optical fiber positioning member 1 in connection with the present invention shown in FIG. 1 will be explained hereinafter.

Figure 3A:
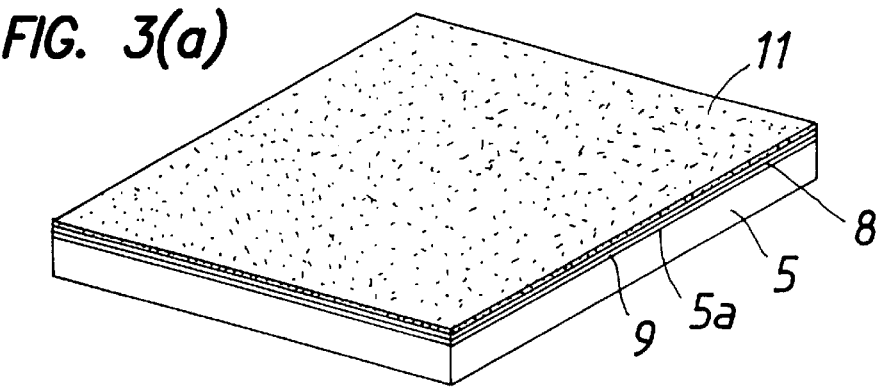
FIGS. 3(a) through 3(c) are views showing a process of manufacturing the optical fiber positioning member in connection with the present invention.
Figure 3B:
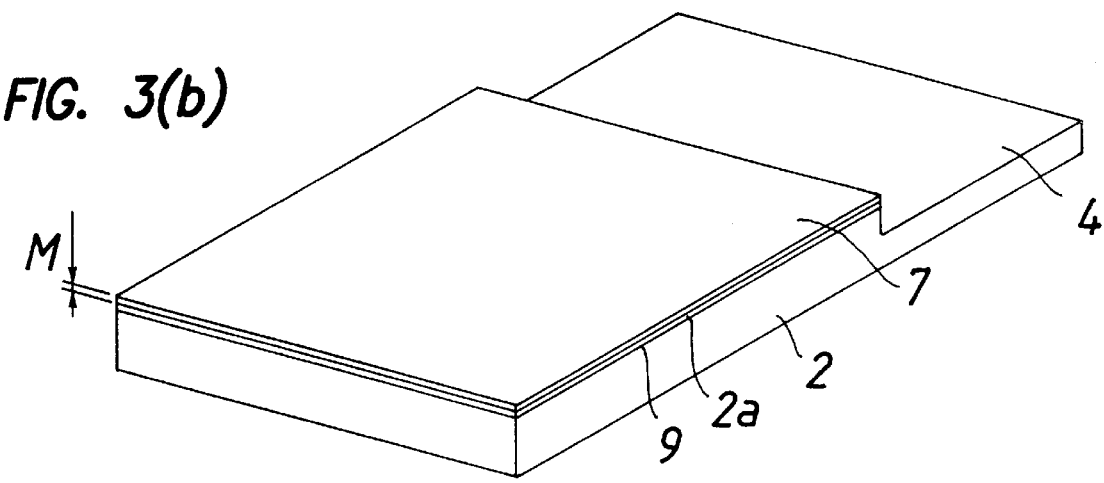

FIGS. 3(a) through 3(b) are views showing the manufacturing process, and first, as shown in FIG. 3(a), laid on the joining surface 5a of the second substrate 5 is the intermediate layer 9 of a metal such as NiCr and Ti, or of a metallic nitride such as TiN, CrN and TiCN, or of a material obtained by laminating them, and then laid on the upper surface of the intermediate layer 9 is the thin film layer 8 formed of one kind metal of Au, Ni, Sn, Pb, Cu and Al, and the solder 11 is applied thereto. Also, as shown in FIG. 3(b), the concave cutout portion is formed on the rear end portion of the first substrate 2, and at the same time, the intermediate layer 9 similar to the second substrate 5 is formed on the surface other than the concave cutout portion 4, and then the thin film layer 7 which is formed of Au and has the film thickness M of 2 to 10 $\mu$m, preferably 3 to 7 $\mu$m is laid.

Also, the intermediate layer 9 laid on the both substrates 2, 5 can be formed by thin film formation means such as ion plating method, sputtering method, vacuum deposition method or PVD (Physical Vapor Deposition) or CVD (Chemical Vapor Deposition), and further, the thin film layers 7, 8 laid on the above-mentioned intermediate layer 9 may be also formed by the above-mentioned thin film formation means. However, it is difficult to form the thin film layer 7 having the film thickness M of 2 to 10 $\mu$m by the above-mentioned thin film formation means, so that the thin film layer 7 which is formed of Au and has the film thickness M of 2 to 10 $\mu$m may be laid by laying of the thin film layer 7 of 1 $\mu$m or less by the above-mentioned thin film formation means and then performing a plating processing.

Figure 3C:
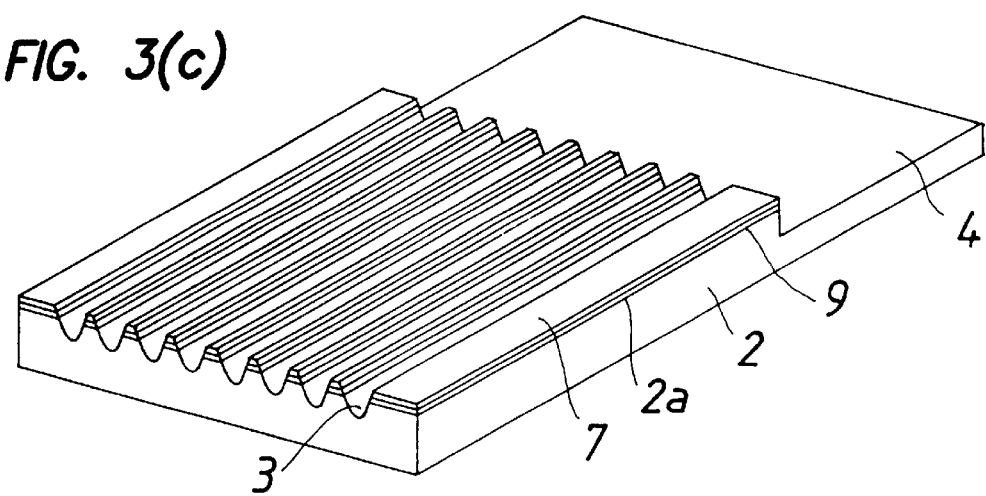
Figure 4:
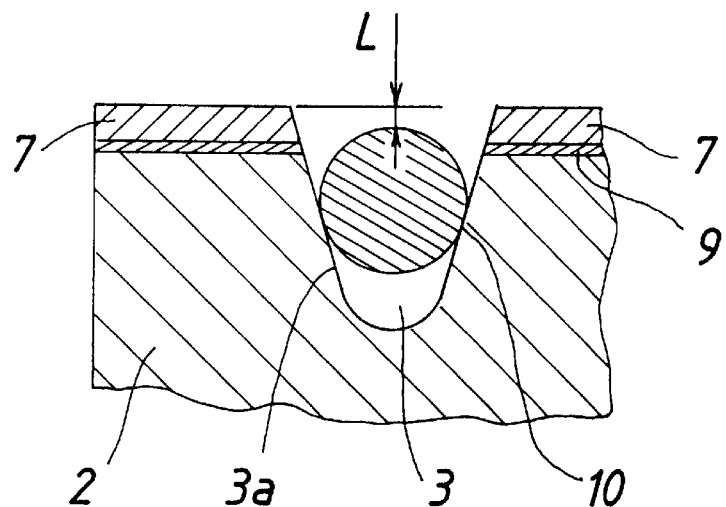
FIG. 4 is a partially sectional view showing a state in which an optical fiber is placed on a concave groove of the first substrate composing the optical fiber positioning member in connection with the present invention.

Then, as shown in FIG. 3(c), a machining is performed from the upper side of the thin film layer 7 of the first substrate 2 to engrave 8-core V-shaped grooves with a high accuracy. Also, V-shaped grooves can be formed by an etching. However, it is necessary that as shown in FIG. 4, when the V-shaped grooves 3 are formed, the optical fibers 10 are placed on the V-shaped grooves 3 in such a manner that the upper surface of the optical fibers 10 is made lower than the upper surface of the thin film layer 7 of the first substrate 2, and that preferably the level difference length L is made 1 $\mu$m or more.

That is because if the upper surface of the optical fibers 10 is equal in height to the upper surface of the thin film layer 7 of the first substrate 2 or protrudes beyond the film layer 7, the optical fibers 10 would be apt to be damaged when the second substrate 5 is urgedly fixed, and because even if the optical fibers 10 are not damaged, the thin film layer 7 formed of Au could not be plastically deformed nor could part of the thin film layer 7 be protruded to the V-shaped groove 3 side, Another method of manufacturing the first substrate 2 may be such that the thin film layer which is formed of Au and has a thickness of 1 $\mu$m or less is laid through the above-mentioned intermediate layer 9 on the joining surface 2a of the first substrate 2, and then a machining is performed to engrave the V-shaped grooves 3, and then a plating processing with Au is performed on the surface other than the V-shaped grooves 3, and the thin film layer 7 having the film thickness M of 2 to 10 $\mu$m is laid, thereby allowing the first substrate 2 to be manufactured as shown in FIG. 3(c).

The second substrate 5 is urged against the first substrate 2 thus formed, and both the substrates are joined by the solder 11, whereby the optical fiber positioning member 1 in connection with the present invention can be obtained.

A method of fixing the optical fibers 10 by using the optical fiber positioning member 1 of the present invention will be explained hereinafter.

First, the covering portion 21 of the ribon optical fiber 20 is placed on the concave cutout portion 4 of the first substrate 2, and at the same time, respective optical fibers 10 from which the covering portion 21 has been stripped off are arranged and placed in the respective V-shaped grooves 3 in such a manner that the optical fibers 10 are abutted against the side wall 3a of the V-shaped grooves 3. Then, the second substrate 5 to which the solder 11 has been applied is placed on and urged against the upper part of the optical fibers 10, and plastically deformed to an extent that part of the thin film layer 7 formed of Au on the first substrate 2 protrudes to the V-shaped groove 3 side, and at the same time, the second substrate 5 is heated to a temperature at which the solder 11 is melted, and joined by the solder 11.

A formation in this manner, as shown in FIG. 2(b), causes a space A formed by the optical fibers 10, the V-shaped grooves 3 and the second substrate 5 to be completely filled with the solder 11, thereby allowing optical fibers 10 to be abutted completely against the side wall 3a of the V-shaped grooves 3, and causes no solder 11 to flow into a bottom surface 3b of the V-shaped grooves 3, thereby allowing the optical fibers 10 to be positioned fixedly to the V-shaped grooves 3 at a high accuracy. Further, the thin film layer 7 which is formed of Au and laid on the first substrate 2 is joined by being plastically deformed, so that part of the thin film layer 7 protrudes in a manner to cover the optical fibers 10 in the V-shaped grooves 3, and the protrusion 7a allows a change in the volume of the solder 11 to be prevented and at the same time, a dislocation of the optical fibers 10 to be blocked. Therefore, respective optical fibers 10 can be positioned fixedly at a high accuracy even for a long period.

Figure 5:
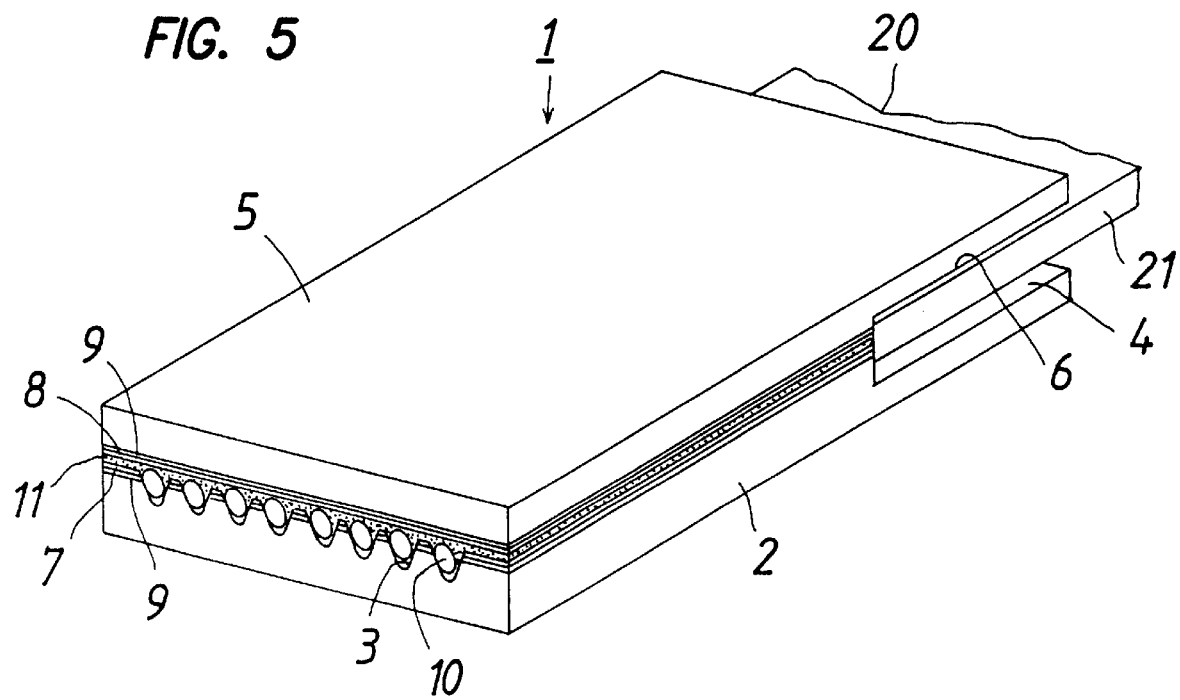
FIG. 5 is a perspective view showing another embodiment of the optical fiber positioning member in connection with the present invention.
Figure 6:
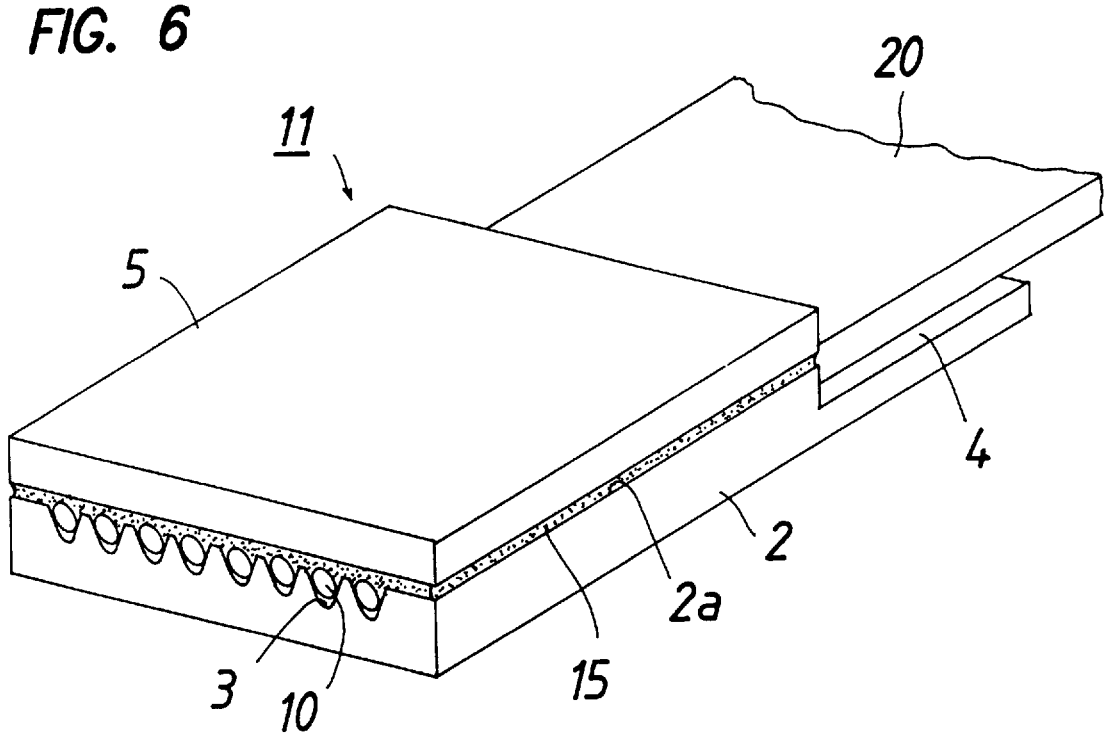
FIG. 6 is a perspective view showing a state in which optical fibers are positioned fixedly by a conventional optical fiber positioning member.
Figure 7:
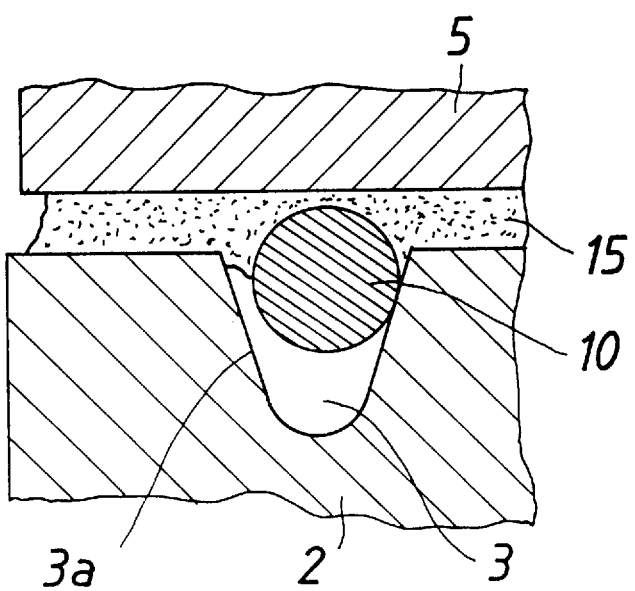
FIG. 7 is a sectional view in which the major parts are enlarged.
Figure 8:
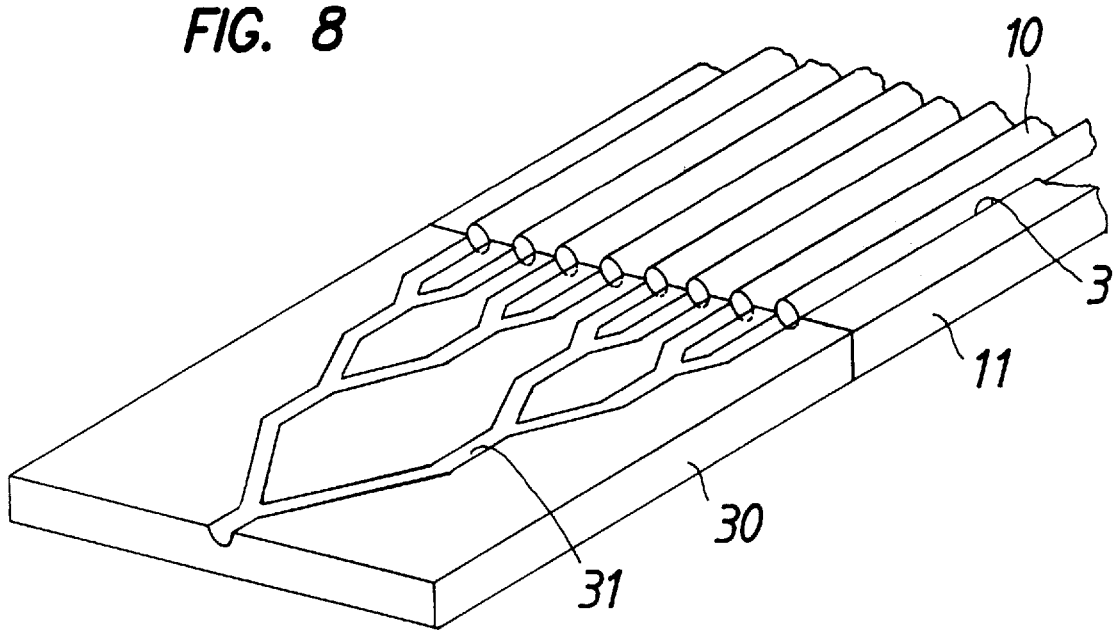
FIG. 8 is a perspective view showing a state in which an optical waveguide way is connected by the optical fiber positioning member to a plurality of optical fibers.

Another embodiment of the optical fiber positioning member 1 in connection with the present invention may be such that as shown in FIG. 5, a second substrate which has the same length as a first substrate and is provided with a concave cutout portion 6 on the rear end portion thereof is prepared, and joined by the solder 11 to the first substrate 2 in which the optical fibers 10 are positioned in the V-shaped grooves 3. With such a structure, the covering portion 21 of the ribon optical fiber 20 can be held between the concave cutout portion 4 of the first substrate 2 and the concave cutout portion 6 of the second substrate 5, so that even if a stress is applied from the outside to the ribbon optical fiber 20, the optical fibers 10 positioned fixedly in the V-shaped grooves 3 would not be damaged. Also, as shown in FIG. 5, the head portion of the optical fiber positioning member 1 in which the optical fibers 10 have been positioned fixedly may be diagonally cut out, and in this case, if the abutting portion of a mating member has been diagonally cut out in a manner to align with the head portion of the optical fiber positioning member 1, they could be connected to each other at a higher accuracy.

[EXPERIMENTAL EXAMPLE 1]

Thus, there was prepared the optical fiber positioning member 1 in which the film thickness M of the thin film layers 7 formed of Au to be laid on the first substrate 2 were made different from each other, and an assembling accuracy when the optical fibers 10 are positioned fixedly was measured.

The samples to be measured employed an alumina ceramic as the material for the substrates 2, 5, and there was prepared the optical fiber positioning member 1 in which the thin film layer 8 formed of Au was laid through the intermediate layer 9 formed by laminating $Ta_2N$ layer and then a NiCr layer on the joining surface 5a; the intermediate layer 9 similar to the first substrate 5 and the thin film layer 7 formed of Au were laid on the second substrate 5 to which the solder 11 has been applied and on the joining surface 2a; and 8-core optical fiber positioning member 1 whose groove depth is 160±0.3 μm and which have an angular accuracy 60°±0.2° were engraved in the above-mentioned first substrate 2 with a pitch 250±0.2 μm. Then, eight optical fibers 10 were placed in respective V-shaped grooves 3 of the above-mentioned first substrate 2, and then urged by the second substrate 5 from the upper side thereof and by the solder 11.

As another comparative example, in a similar manner, there was also measured the assembling accuracy of the optical fiber positioning member 1 in which second substrate 5 made of silica glass was joined by a thermoset adhesive 15 to the first substrate 2 made of alumina ceramic.

Evaluation criterion was made such that a sample in which both the horizontal pitch accuracy and the vertical pitch accuracy were ±0.5 μm or less each was evaluated to be excellent.

Respective results are as shown in Table 1.

TABLE 1

| No. | Film thickness of Au thin film layer (μm) | Horizontal pitch accuracy (μm) | Vertical pitch accuracy (μm) | Assembling accuracy evaluation |
|---|---|---|---|---|
| *1 | 0.5 | ±0.6 | ±0.7 | x |
| 2 | 2 | ±0.3 | +0.4 | o |
| 3 | 4 | ±0.3 | ±0.4 | o |
| 4 | 5 | ±0.3 | ±0.5 | o |
| 5 | 8 | ±0.3 | ±0.5 | o |
| 6 | 10 | ±0.4 | ±0.5 | o |
| *7 | 12 | ±0.8 | ±0.9 | x |
| *8 | Sample joined by adhesion | ±0.8 | ±0.5 | x |

* shows comparative examples.

As apparent from Table 1, for sample No. 8 joined by the adhesive 15, as the thermoset adhesive 15 was set, the optical fibers 10 were dislocated, so that the horizontal pitch accuracy could not be made ±0.5 μm or less.

Also, for sample No. 1, the film thickness M of the thin film layer 7 laid on the first substrate 2 was as thin as 2 μm or less, so that a protrusion made of the thin film layer 7 could not be formed on the V-shaped groove 3 side by plastically deforming the thin film layer 7. As a result, only the solder 11 was fixed, so that both the horizontal pitch accuracy and the vertical pitch accuracy could not be made ±0.5 μm or less each. Further, for sample No. 7, the film thickness M of the thin film layer 7 was excessively thick, so that the upper portion of the optical fibers 10 could not be sufficiently filled with the solder 11. As a result, the pitches were deviated largely from the reference value such that the horizontal pitch accuracy became ±0.8 μm, and the vertical pitch accuracy became ±0.9 μm.

On the contrary, for sample Nos. 2 through 6 within the range of the present invention, the film thickness M of the thin film layer 7 was within the range 2 to 10 μm, so that both the horizontal pitch accuracy and the vertical pitch accuracy could be made ±0.5 μm or less each, thereby allowing the reference value to be satisfied.

[EXPERIMENTAL EXAMPLE 2]

Then, using the samples shown in the above-mentioned Table 1, a heat cycle test was performed, and respective optical fiber positioning accuracies at that time were measured.

The test conditions of the heat cycle test were such that one cycle in which a test temperature is increased from −40° C. to 75° C. took three hours, then the temperature of 75° C. was held for one hour, and then the temperature was decreased from 75° C. to −40° C. taking three hours, and then the temperature of −40° C. was held for one hour, and this was repeated forty two times and then the horizontal pitch accuracy and the vertical pitch accuracy of the optical fibers were measured.

Evaluation criterion was made such that a sample in which both the horizontal pitch accuracy and the vertical pitch accuracy were ±0.6 μm or less each was evaluated to be excellent.

Respective results are as shown in Table 2.

TABLE 2

| No. | Film thickness of Au thin film layer (μm) | Horizontal pitch accuracy (μm) | Vertical pitch accuracy (μm) | Assembling accuracy evaluation |
|---|---|---|---|---|
| *1 | 1 | ±0.6 | ±0.7 | x |
| 2 | 2 | ±0.3 | ±0.5 | o |
| 3 | 4 | ±0.3 | ±0.5 | o |
| 4 | 5 | ±0.3 | ±0.5 | o |
| 5 | 8 | ±0.4 | ±0.6 | o |
| 6 | 10 | ±0.5 | ±0.6 | o |
| *7 | 15 | ±0.9 | ±0.9 | x |
| *8 | Sample joined by adhesion | ±0.7 | ±0.8 | x |

* shows comparative examples.

As apparent from Table 2, for sample No. 8 joined by the adhesive 15, as the adhesive 15 changed in volume, a large dislocation was developed such that the horizontal pitch accuracy became ±0.7 μm, and the vertical pitch accuracy became ±0.8 μm, thereby allowing the reference value not to be satisfied.

Also, for sample No. 1, although both the horizontal pitch accuracy and the vertical pitch accuracy were the same as those at assembling, the accuracy at assembling was poor, so that the vertical pitch accuracy did not satisfy the reference value.

Further, for sample No. 7, both the accuracies were deviated largely from those assembling and thus did not satisfy the reference value at all.

On the contrary, for sample Nos. 2 through 6 within the range of the present invention, the film thickness M of the thin film layer 7 was within the range 2 to 10 μm, so that both the horizontal pitch accuracy and the vertical pitch accuracy could be made ±0.6 μm or less each. Particularly, for samples Nos. 2 through 4, the film thickness M of the thin film layer 7 was within the range 2 to 7 μm, thereby allowing an excellent positioning accuracy.

As described previously, the optical fiber positioning member of the present invention is composed such that a thin film layer formed of a material having good wetting properties with respect to solder is laid on the joining surface of the second substrate, and at the same time, a thin film layer formed of Au is laid on the surface excluding concave grooves of the first substrate, and both the substrates are solder joined to each other, so that the first substrate and the second substrate can be firmly joined to each other, and at the same time, optical fibers can be held between the first substrate and the second substrate and thus positioned fixedly at a high accuracy in the concave grooves.

Also, the present invention is made such that optical fibers are placed in the concave grooves of the first substrate, then the upper side thereof is urged by the second substrate to plastically deform the thin film layer formed of Au on the first substrate, whereby part of the thin film layer is protruded to the concave groove side to prevent a dislocation of optical fibers, and at the same time, a change in the volume of solder can be restrained to allow the optical fibers to be firmly abutted against the side wall of the concave grooves.

Therefore, positioning fixedly optical fibers by using the optical fiber positioning member of the present invention allows integrated optical parts or a plurality of optical fibers to be connected at a high accuracy to each other, so that a connection with a very little loss in optical transmission becomes possible.

I claim:

1. An optical fiber positioning member, comprising:

a first substrate defining a first joining surface and at least one substantially concave groove engraved therein, a second substrate defining a second joining surface, a first thin film layer formed on the first joining surface, the first thin film layer having a wetting property and having a thickness of between about 2 and 10 μm, a second thin film layer comprising a solderable material formed on the second joining surface, at least one optical fiber positioned in the at least one substantially concave groove engraved in the first substrate, the first substrate and the second substrate being pressed and joined together with solder at the joining surfaces, whereby the first thin film layer is plastically deformed and protruded over the concave groove and the at least one optical fiber is fixedly positioned in the at least one substantially concave groove engraved in the first substrate.

2. An optical fiber positioning member of claim 1, wherein the second thin film layer includes one of Au, Ni, Sn, Pb, Cu and Al.

3. An optical fiber positioning member of claim 1, wherein the first thin film layer is not formed on the at least one substantially concaved groove formed on the first joining surface.

4. An optical fiber positioning member of claim 1, further including a first intermediate film layer formed between the first thin film layer and the first joining surface comprising one of NiCr, Ti, Tin, CrN and TiCN.

5. An optical fiber positioning member of claim 4, wherein the first intermediate film layer is about 0.3 μm or less in thickness.

6. An optical fiber positioning member of claim 4, wherein the first intermediate film layer is not formed on the at least one substantially concaved groove formed on the first joining surface.

7. An optical fiber positioning member of claim 1, further including a second intermediate film layer formed between the second thin film layer and the second joining surface comprising one of NiCr, Ti, TiN, CrN and TiCN.

8. An optical fiber positioning member of claim 7, wherein the second intermediate film layer is about 0.3 μm or less in thickness.

9. An optical fiber positioning member of claim 1, wherein the at least one substantially concaved groove is engraved with a sufficient depth so that the at least one optical fiber is positioned below a surface defined by the first thin film layer.

10. An optical fiber positioning member of claim 1, wherein the first substrate and the second substrate is formed at least one of ceramic, glass and silicon.

* * * * *